Aug. 10, 1954  J. D. HARDY ET AL  2,685,795
PAN-RADIOMETER
Filed Jan. 28, 1953  3 Sheets-Sheet 1
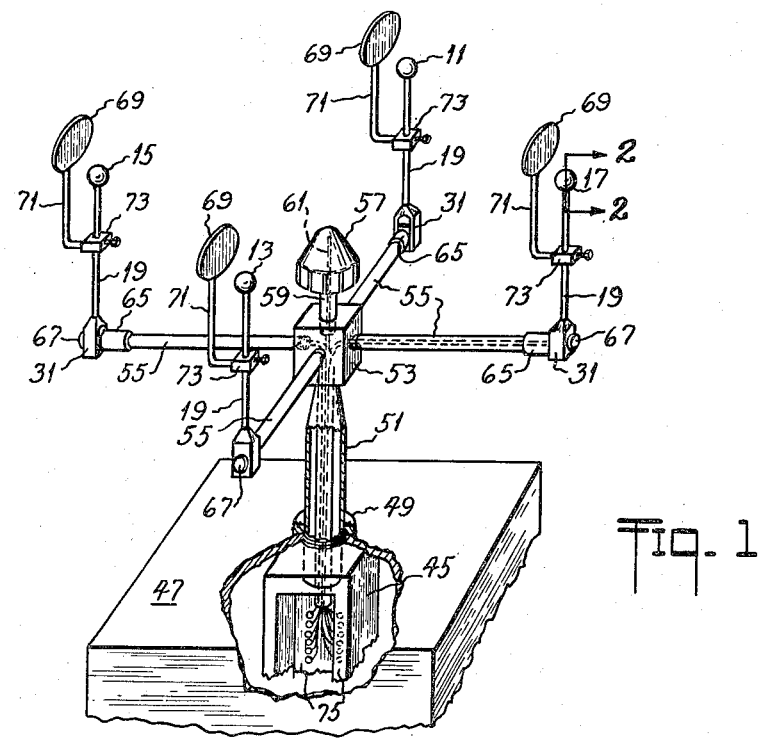
Fig. 1
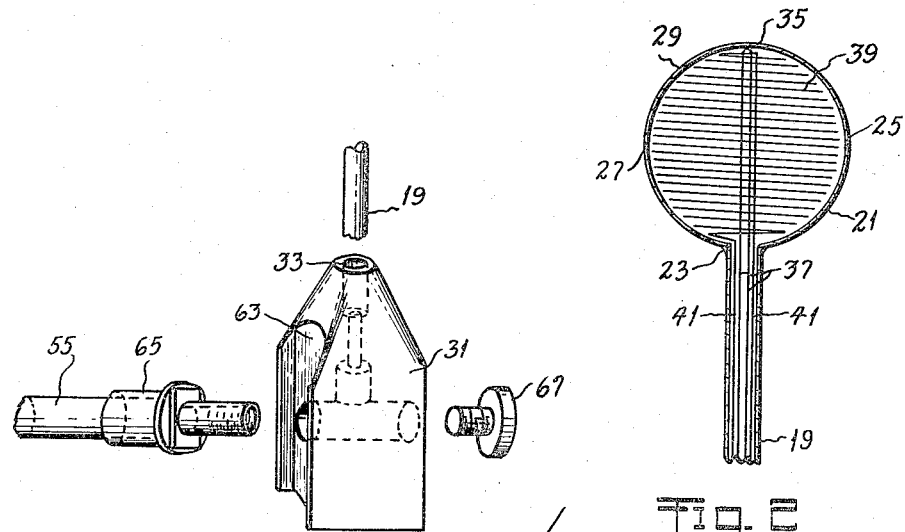
Fig. 2
Fig. 3
INVENTORS.
JAMES D. HARDY
CHARLES H. RICHARDS
ALICE M. STOLL
BY
ATTORNEYS

INVENTORS.
JAMES D. HARDY
CHARLES H. RICHARDS
ALICE M. STOLL
BY
ATTORNEYS

Patented Aug. 10, 1954

2,685,795

UNITED STATES PATENT OFFICE 2,685,795

PAN-RADIOMETER

James D. Hardy, Charles H. Richards, and Alice M. Stoll, New York, N. Y., assignors, by mesne assignments, to the United States of America as represented by the Secretary of the Navy Application January 28, 1953, Serial No. 343,018

7 Claims. (Cl. 73—170)

This invention relates to improvements in means for measuring thermal exchanges, and more particularly pertains to improvements in instruments for measuring environmental radiation.

In order to understand man's adaptation to his external environment, it is necessary to obtain measurements of the thermal exchanges between man and his surroundings. To determine the magnitude of the thermal stress on man, data must be obtained from physical measurements of the environment. These measurements include determination of air temperature and velocity, relative humidity, and total environmental radiation.

The difficulty associated with obtaining satisfactory estimates of environmental radiation have been so great that the question has been avoided to a large degree and partial solution sought in the use of instruments that give an index rather than a measurement of this quantity. Such instruments include the katathermometer, the eupathoscope, the globe-thermometer, the Sol-aire thermometer and the thermo-integrator, which give useful indices of heat load. But these instruments, since they give relative rather than absolute indications, cannot be intercompared to evaluate the magnitude or the relative values of physical factors involved in the thermal load on the human subject. Largely for this reason, systematic study of the heat load in the environment has been restricted to the carefully controlled, air-conditioned spaces of test chambers.

The principal object of this invention is to provide an instrument for measuring environmental radiation quantitatively. It is the purpose of the panradiometer herein described to make measurements of the total outdoor environmental radiation and of the two major components of this radiation in terms of standard physical units.

Another object is to provide a device for quantitative measure of environmental radiation utilizing the fact that more than ninety-nine percent of the sun's radiation lies at wavelengths shorter than three mu, and that about the same proportion of the radiation from man to his surroundings lies at wavelengths longer than four mu.

A further object is to provide an instrument adapted to measure separately and to correlate the intensity of factors of environmental radiation such as the high temperature radiation direct from the sun, the scattered light from the sun, the reflected light from the sun, and the low temperature radiation exchange between a subject and the sky and objects of the terrestrial environment, the radiant heat lost or gained by man being the algebraic sum of the radiations from all sources. By measuring separately the intensity of these radiations at the place occupied by the man and then combining their effects after correcting for the reflecting power of the man's skin and clothing, quantitative measure of environmental radiation is achieved.

Other objects and many of the attendant advantages of this invention will be readily appreciated as the same becomes better understood by reference to the following detailed description when considered in connection with the accompanying drawings wherein:

Fig. 1 is a perspective view of the spheres and cross-arm support of a panradiometer, partly broken away, showing a preferred embodiment of the invention;

Fig. 2 is a sectional elevation of a sphere thereof;

Fig. 3 is an exploded perspective view of the sphere support thereof;

Similar numerals refer to similar parts throughout the several views.

Figure 4:
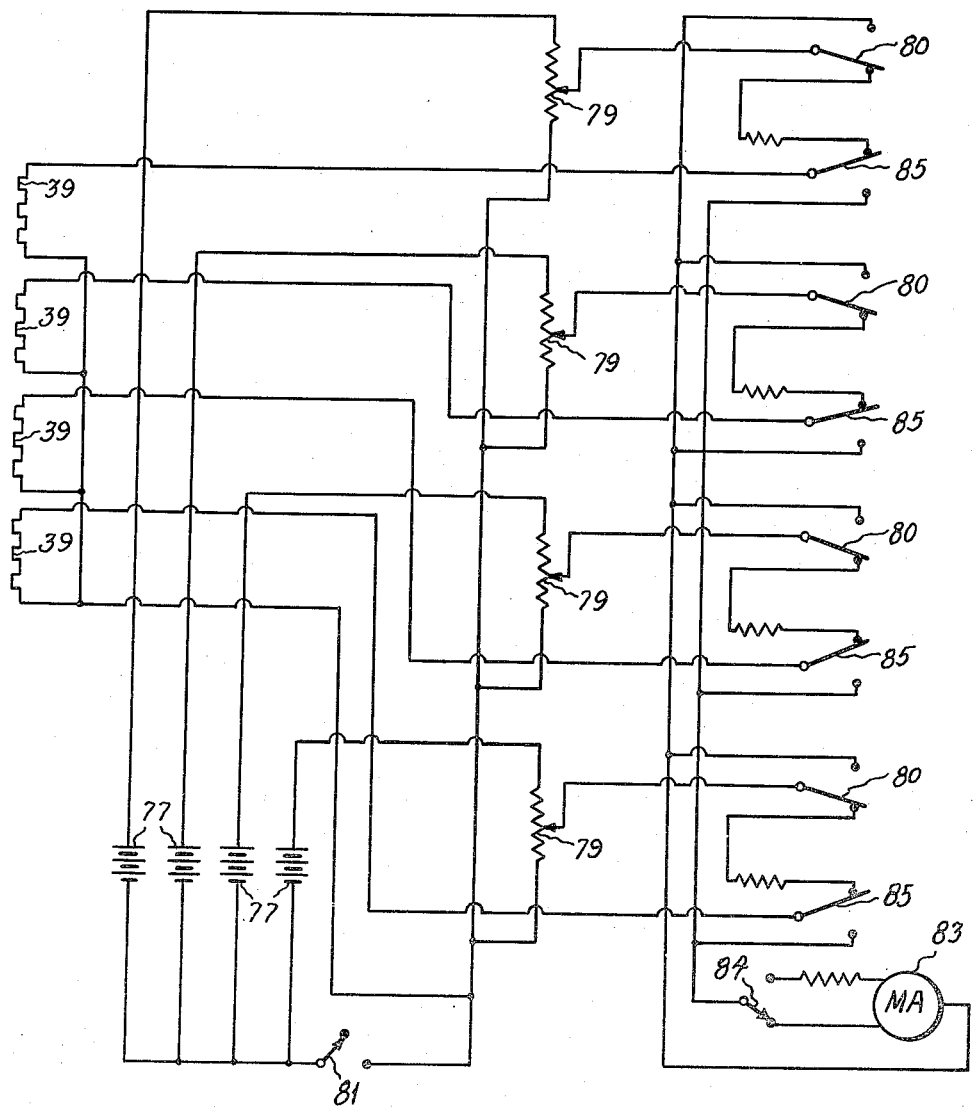
Fig. 4 is a schematic wiring diagram of the heater circuit thereof.

The panradiometer, which views the entire environment, consists essentially of four silver spheres 11, 13, 15 and 17 mounted upon fine steel tubing supports 19. Sphere 11 is painted a dull black, sphere 13 is painted matte white, and spheres 15 and 17 are polished. The spheres are otherwise of identical construction.

Black sphere 11, white sphere 13 and polished sphere 15 are employed for radiation measurements; polished sphere 17 provides for the measurement of wind velocity as a hot-sphere anemometer. When the instrument is placed in a clear, sunny outdoor environment, the black sphere 11 will become warm because of absorption of the sun's radiation, the polished spheres 15 and 17 will be just above ambient air temperature, and the white sphere 13 will be slightly below ambient air temperature because of heat loss by radiation to the cool sky, while most of the incident visible radiation is reflected. Since the spheres provide similar surfaces of different emissivity, electrical energy is put into the cooler spheres so as to heat them to the temperature of the black sphere 11, this heat will represent accurately the difference in the amount of radiation received from or lost to the environment by the spheres of different emissivity. Considering the equations of heat balance for the spheres, at the point of equilibrium the heat gained by the black sphere from the sun equals the heat lost by the black sphere to the environment through conduction along the support, convention losses to the cooler objects in the environment. Thus, for the black sphere 11, $$RE_{bv} = C + D + S_0 E_{bi} E_{si}(T_b^4 - T_s^4) \quad (1)$$

where $R$=total radiation from the sun incident upon the sphere (direct+reflected+scattered energy), $E_{bv}$=emissivity of the black sphere in the visible and near infrared spectral regions $(0.4\mu-3\mu)$, $C$=convection loss from the sphere to ambient air, $D$=conductive loss along the steel tubing support, $S_0$=the Stephan-Boltzmann constant, $T_b$=absolute temperature of the black sphere, $T_s$=average absolute temperature of the surroundings, including the sky and terrestrial environment, $E_{bi}$=emissivity of the black sphere in the infrared region beyond $3\mu$, and $E_{si}$=emissivity of the environment in the infrared region beyond $3\mu$. Similar equations can be written for the white and polished spheres. For the white sphere:

$$I_w + R \times E_{wv} = C + D + S_0 E_{wi} E_{si}(T_b^4 - T_s^4) \quad (2)$$

where $I_w$=heat put into the white sphere to bring its temperature up to that of the black sphere. The other symbols are defined for Equation 1 except that the emissivity values in Equation 2 refer to the white surface. For the polished sphere:

$$I_p + R \times E_{pv} = C + D + S_0 E_{pi} E_{si}(T_b^4 - T_s^4) \quad (3)$$

where $I_p$=heat put into the polished sphere, and the emissivity values refer to the polished surface.

Solving Equations 1, 2, and 3 simultaneously cancels the effects of conduction and convection as the spheres are of identical construction and are all at the same temperature. This allows the estimation of both the sun's radiation, R, and the value of $T_s$ which is the "radiant" temperature of the environment if the emissivity of the environment ($E_{si}$) be high, i. e., nearly unity. The quantities which must be measured are: the electrical heat inputs to the spheres, the temperature of the black sphere, and the emissivity of each of the spheres in the visible and infrared spectral regions. Thus, $$R = \frac{I_w - I_p[(E_{pi} - E_{wi})/(E_{bi} - E_{pi})]}{(E_{bv} - E_{wv}) - [(E_{pi} - E_{wi})/(E_{bi} - E_{pi})](E_{br} - E_{pv})} \quad (4)$$

$$T_s^4 = T_b^4 + \frac{I_w - R(E_{bv} - E_{wv})}{S_0(E_{bi} - E_{wi})} \quad (5)$$

As the relationships between the emissivities of the spheres are constants, Equations 4 and 5 can be written more simply for purposes of calculation as $$R = (I_w - I_p K)/(a - bK)$$

$$T_s^4 = T_b^4 + [(I_w - Ra)/S_0 b]$$

where $(E_{pi} - E_{wi})/(E_{bi} - E_{pi}) = K$; $(E_{bv} - E_{wv}) = a$; and $(E_{bv} - E_{wi}) = b$.

Examination of Equations 4 and 5 shows the importance of obtaining accurate values for the emissivities of the spheres. A discussion of the methods used to obtain satisfactory values of the infrared and visible spectral emissivity follows:

EMISSIVITY DETERMINATIONS

The emissivity of the black and the white paints in the infrared range $(4\mu-100\mu)$ was determined by comparison of the emissive power of a surface painted with each of these paints and that of a black body (Leslie cube) at the same temperature. The emissivity of the black paint was $0.952 \pm 0.004$, and that of the white paint was $0.888 \pm 0.002$. The procedure in making these measurements was as follows: A cylindrical inset was made in one side of a Leslie cube (standard black body). This inset was painted with the paint to be tested. In making a measurement the cube was filled with water, which was stirred constantly and the temperature of which was noted continuously throughout the measurement. The cylindrical inset was covered while a radiometer was exposed to the cone and the output of the radiometer was noted. The radiometer was then exposed to the painted surface on removal of the cover, and this reading was then noted. A second Leslie cube at a known temperature lower than that of the test cube was used as the reference body for the radiometer. The emissivity of the paint was then determined from the relationship:

$$E_p = EMF^p/EMF^b$$

where $E_p$=emissivity of paint, $EMF^p$=radiometer output on exposure to painted surface, and $EMF^b$=radiometer output on exposure to standard blackened cone.

In a similar manner the emissivity of the polished (chromium) surface in the infrared range was determined by comparison of the radiometer output on exposure to the standard black body and on exposure to a spherical chromium plated surface six inches in diameter at the same temperature. Again a second cube at a known lower temperature was used as the reference body for the radiometer.

The emissivity of the chromium surface was found to be $0.036 \pm 0.006$.

The emissivities of the black and the white paints in the visible range were determined by spectrophotometric techniques. For the black paint this emissivity was 0.96. The spectrophotometric curve plotted for the white paint, however, did not include the near infrared region, and the emissivity of this paint appeared to be 0.21 from the data available. From Bureau of Standards data on the reflectivity and coefficient of absorption of polished surfaces, the emissivity of the polished chromium surface appeared to be about 0.21. It was, therefore, necessary to determine the emissivities of the white and the chromium surfaces in the visible range more accurately. This could be most easily accomplished by means of a reflectometer, but a calibration of the panradiometer was done by making measurements of the $T_s$ and R with radiometers calibrated independently. This was accomplished in the following manner:

On a clear day in sunlight and in the shade a balance was obtained by raising the white and polished spheres to the temperature of the black sphere. From these measurements, using the aproximate values for emissivities in the visible range, the radiant temperature of the surroundings, $T_s$, and the direct solar radiation, $R_0$, were computed. At the time of the panradiometer measurements, both of these quantities were measured directly by means of radiometers. Thus it was possible to compare the values computed from the panradiometer measurements with those obtained independently. It was found that $T_s$ as measured with the panradiometer in sunlight was about 6° C. too low and in the shade about 2.5° C. too low. This indicated that the emissivity factor of the polished sphere was too high. Because of discrepancies in $T_s$ when calculated from the equation for heat balance between the black and the polished as compared with that of the black and white spheres, it was also apparent that the emissivity factor for the white sphere was too low. Furthermore, the values for $R_0$ as computed from these heat balance equations did not agree with each other or with the independently measured value. By use of the direct radiometric measurements of $R_0$ and $T_s$ it was found that the difference in emissivity between the white and the polished surfaces was 0.12, and that the difference in emissivity between the black and the polished surface was 0.80. Therefore, the emissivity of the white sphere was 0.16 and that of the polished sphere was 0.28. On the basis of these constants the data previously obtained with the panradiometer was recalculated. Good agreement was obtained in the determinations of both $R_0$ and $T_s$ from the equations for heat balance between any two spheres, as well as between the panradiometer and the independent measurements.

The total radiation incident upon man may be summed up in the expression:

$$R = R_0 + aR_0 + rR_0 \pm H_t \qquad (6)$$

where $R$=total radiation, $R_0$=direct solar radiation, $aR_0$=reflected solar radiation, $rR_0$=scattered solar radiation, and $H_t$=heat rays to or from terrestrial objects and sky (exclusive of sun's rays).

For practical purposes all energy units were expressed in kilogram calories per square meter per hour, and calculations were based on a unit sphere of 1 m.² The effective radiating area of the average man is larger than one meter squared as the average surface area of man is about 1.8 m.² and the effective radiating area of a man is seventy-five to eighty-five percent of this value. Corrections for posture, orientation, etc. are necessary if a particular solution of the radiant heat load is desired.

R in the sunlight may be calculated from the heat balance between any two spheres. Also, by shading the spheres with polished disks and measuring R′, the total radiation in the shade, the direct solar radiation, may be determined. Thus if the white and polished spheres are balanced against the black sphere in the sun, the total radiation is obtained as follows:

$$R = (R_0/4) + R_0(r+a) - (E_{wi} - E_{pi})(T_b^4 - T_s^4)S_0 \qquad (7)$$

and in the shade:

$$1.1R' = R_0(r+a) - (E_{wi} - E_{pi})(T_b'^4 - T_s^4)S_0 \qquad (8)$$

The value of R′ has been increased by ten percent to account for the solid angle of the sky which is cut off by the shading disks hereinafter described. When these two equations are subtracted and solved for $R_0$, then $$(R_0/4) = R - 1.1R' + (E_{wi} - E_{pi})(T_b^4 - T_b'^4)S_0 \qquad (9)$$

All the quantities on the right of the equation are known. Also if T is equal to $T_b'$ within 1° C. as is usually the case, then $$R_0 = 4(R - 1.1R') \qquad (10)$$

On clear, cloudless days it is possible to determine the total reflectivity of the terrestrial environment. Under these conditions $aR_0$, the scattered radiation, is small in comparison to the reflected radiation and may be neglected. Then $$a = R/R_0$$

When $a$ has been determined for a given environment then $r$ may be determined for any subsequent condition of the sky, as, $$r = (R/R_0) - a$$

Wind velocity measurements are important in any description of the environment. They were made with the panradiometer by supplying a fixed quantity of heat to one of the polished spheres and comparing its temperature with that of the unheated polished sphere. An anemometer of this construction has been previously described by Guillemin in a report from the Aero Medical Laboratory at Wright-Patterson Air Force Base.[1] The difference in temperature between the spheres may be related to wind velocity by the factor K in the relationship derived from Nusselt's and Reynold's equations:

$$V = (H/K\Delta t)^2$$

where $V$=wind velocity, $H$=heat supplied, $\Delta t$=difference in temperature, and $K$=a constant. Then for any measured value of H and $\Delta t$, K may be determined $$V = K'(H/\Delta t)^2$$

K must be determined experimentally for the particular instrument in a wind tunnel.

As the velocity depends upon both H and $\Delta t$ it is often convenient to hold one of these factors constant and obtain a calibration of the anemometer in terms of the other, i. e., by putting in a fixed amount of heat, the velocity can be determined by the difference in temperature between the spheres. However, as H and $\Delta t$ both can be measured it is sometimes desirable to have a calibration of the anemometer in terms of both H and $\Delta t$. For example, this method permits a reading of air velocity while maintaining the thermal balance between the polished sphere and the black sphere by measuring the heat input to the heated sphere and the difference in temperature between the heated and unheated polished spheres. With an improvised wind tunnel it was possible to determine K′ approximately. Qualitative variations in wind velocity may be observed continuously by means of a millivoltmeter across the circuit between a heated polished sphere and the air temperature measuring thermocouple, while measurements of R are being made. This indication is helpful as it allows the observer to make the final balance of temperature of the spheres during a period of roughly constant air velocity. (Accurate balances are difficult to make during a sudden gust of wind.)

*The radiation receivers*

The four spheres 11, 13, 15 and 17 are of identical construction in order to make the heat input required to cause identical elevation in temperature the same. Each sphere is made of silver foil punched out into hemispheres. The sphere 17 is illustrative: The lower hemisphere 21 is pierced at the pole 23 to provide for mounting. The inside bevel 25 of the lower hemisphere mates with the outside bevel 27 of the upper

---

[1] V. Guillemin, Jr., Engr. Div., Aero Medical Lab., Wright-Patterson Air Force Base, Report No. TSEAA-695-75 (October 1, 1947).

hemisphere 29 so that the two elements fit together exactly and form a perfect sphere when joined.

The support for each sphere is a length of stainless steel tubing 19 mounted on brass base 31. Said tubing 19 is inserted into the bore 33 of the conical upper portion of said base and soldered into place. The lower hemisphere 21 is then silver soldered to the supporting tubing 19.

A copper-manganam thermocouple 35 is soldered to the inside surface at the pole of the upper hemisphere. The leads 37 of said thermocouple are twisted together and coated with dilute cellulose acetate cement to improve insulation.

In the construction of the heater coil 39, a length of copper wire 41 is silver soldered to each end of said heater coil, and the resistance of the heater measured. The splices are coated with a thin layer of cellulose acetate for insulation. The entire length—heater plus leads—is then doubled and wound to form two hemispheres. After winding, the wire hemispheres are coated with cellulose acetate cement, which is allowed to dry before the coil is removed from the molds in which it is formed. On removal, the copper leads are passed through the opening at the pole of the lower wire hemisphere and the upper hemisphere is turned and drawn into place against the lower one to shape the heater into a sphere. The two wire hemispheres are cemented together, the heater coil now being in the form of a sphere, the outside of which approximates closely the inner surface of the sphere 17. This construction provides uniform heating of the silver shell and decreases the time required to obtain a thermal balance.

After tinning the bevels 25 and 27 of the hemispheres, the assembly is accomplished by running the thermocouple leads 37 through the holes at the poles of the heater coil 39 and then passing the said thermocouple leads and the heater leads 41 through the tubular support 19 and out through the base 31. The hemispheres 21 and 29 are then joined at the equator, the excess solder at the joint removed, and a high polish is produced on the surface by buffing, as with fine emery, diamond white and jeweler's rouge. Finally, the sphere is chrome plated for protection against weather and tarnishing.

Assembly

The cross-arm support shown in Figs. 1 and 3 comprises a chromium-plated brass support block 45 fastened within the chassis housing 47, with the collar 49 retaining tubular mast 51 secured to said block 45. The junction block 53 is mounted upon the mast 51 and carries the four tubular cross-arms 55. A polished housing 57 secured upon block 53 by stub mast 59 contains a thermocouple 61. Said housing protects the thermocouple 61 from radiation and permits free circulation of air around said thermocouple.

The base 31 is cross-bored, as shown in Fig. 3, and is provided with a channeled side 63 adapted to mate with an adaptor 65 that is fastened on each arm 55, the adaptor screw 67 securing the arm 55 and its adaptor 65 to the base 31. This assembly assures maintenance of the upright positions of the sphere shafts 19.

Shades 69 mounted on arms 71 are secured removably to the tubing 19 by means of clamps 73.

The leads from all heaters and thermocouples are passed through the cross-arms to the vertical tube and support to terminal strips 75 mounted in the block 45 for coupling with the circuits hereinafter described.

Heater circuits

Dry cells 77 supply voltage to the heaters 39. The circuit for each said heater comprises a cell 77, heater 39, a variable resistor 79, and a selector switch 80, arranged in series with circuit breaking switch 81. The heater current is indicated by a milliammeter 83 having two scale ranges, selected by means of switch 84. Said meter is introduced into one of the four heater circuits by means of one of the switches 85.

Thermocouple circuit

Figure 5:
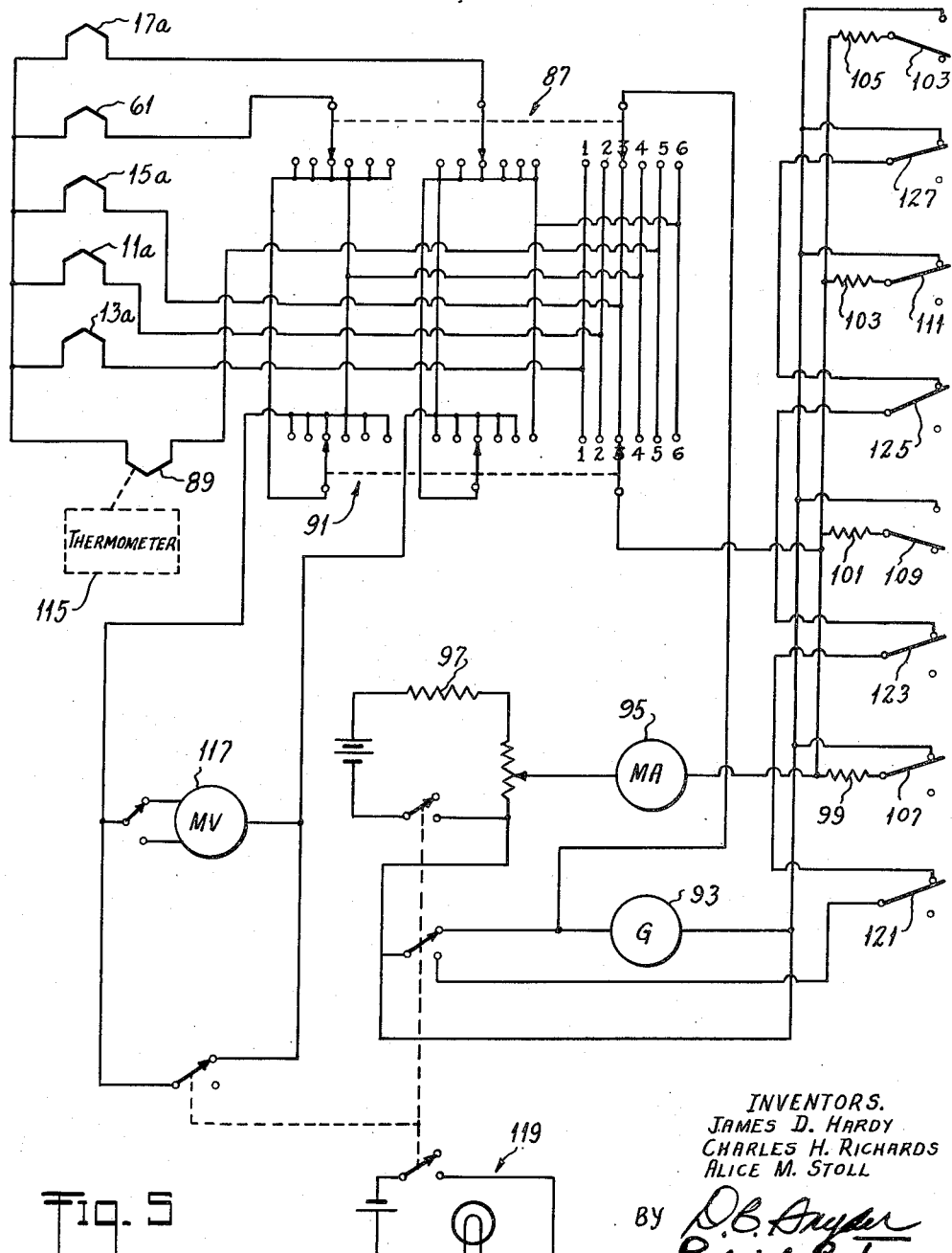
Fig. 5 is a schematic wiring diagram of the balance circuit thereof.

The thermocouple circuit shown in Fig. 5 includes a first three-bank six-position switch 87 adapted to be coupled selectively to the thermocouples of the black sphere 11, the white sphere 13, and the polished spheres 15 and 17, the air thermocouple 61 and a reference thermocouple 89. (The thermocouples of the respective spheres are designated by the subscript "$a$" appended to the sphere numeral designation of Fig. 1.) A second three-bank six-position switch 91 permits selective comparison coupling in the manner hereinafter described.

The circuit further includes a galvanometer 93 that is used as a null-point instrument, a potentiometer system having a microammeter 95 arranged in series with a high precision fixed resistor 97, and a plurality of fixed resistors 99, 101, 103, and 105. The resistors 99, 101, 103 and 105 are stepped in value and each can be introduced into the circuit alternatively by means of switches 107, 109, 111 and 113 respectively to provide scale multiplication. A reference thermometer 115 has a stem imbedded in a brass block to which the reference thermocouple 89 is soldered.

The circuit further provides a two-scale millivoltmeter 117 across the line and a galvanometer lamp circuit 119 linked mechanically to the line, the galvanometer and the milliammeter to indicate visually the closed circuit condition.

The circuitry can best be understood by consideration of the sequence of steps followed in employment of the device. The following examples illustrate mode of operation and explain circuitry in several applications of the device:

EXAMPLE 1

In measuring sphere temperatures, it is necessary to know only the temperature of the black sphere 11, on the one hand, or of the polished sphere 15 or 17, on the other hand, depending upon which of the two is higher. The position of the galvanometer 93 of zero deflection can then be noted by setting switch 87 at position marked 5 against switch 91 at position marked 5. When the reference temperature is greater than the sphere temperature, a condition determined by the direction of deflection of the galvanometer 93, the switch 91 is set at position marked 5, the reference, and switch 87 is set at the position corresponding to the sphere to be measured. The positions 1, 2, 3 and 4 correspond to the spheres 13, 11, 15 and 17 respectively. The galvanometer 93 is then brought to the zero point by manipulation of the potentiometer and multiplier resistors 99, 101, 103 or 105 thrown into the circuit by closing their respective switches. The current reading of the microammeter under such condition, multiplied by the factor of the value of the multiplying resistor used, will then equal the microvolt output of the thermocouples between the reference and the sphere. Then the sphere temperature in degrees centigrade equals the reference temperature minus $$\frac{\text{Microvolt output}}{40}$$

(The fraction $\frac{1}{40}$ is an approximation of the amount to be added to or subtracted from the reference temperature, and is based on the voltage output of a copper-constantan thermocouple, which is about 40 $\mu$ v./° C. at a temperature level of about 40° C. Alternatively, a table of E. M. F./° C. can be used to make this determination.)

When the reference temperature is lower than the sphere temperature, switch 87 is set on position 5 and the sphere to be measured set on switch 91. Upon adjusting the galvanometer to zero and reading current as above, the temperature of the sphere can be derived from the addition of the reference temperature in degrees centigrade to $$\frac{\text{Microvolt output}}{40}$$

EXAMPLE 2

To measure air temperature, the galvanometer is set at zero position with switch 87 on position 5 and switch 91 on position 5. When the reference temperature is greater than the air temperature, switch 87 is set on position 6 and the sequence described above with reference to determining microvolt output followed. When the reference temperature is lower than air temperature, the setting of switch 91 at position 6 and switch 87 at position 5 permits determination of microvolt output.

EXAMPLE 3

To bring the white, polished and black spheres to the same temperature, the sphere of highest temperature is determined by the procedure described in Example 1. (In sunlight, the black sphere is usually the sphere of highest temperature; at night, the polished spheres are usually the spheres of highest temperature.) Switches 91 and 87 are then set on the position corresponding to the sphere of highest temperature and the galvanometer zero position noted. Switch 87 is then set on the position corresponding to the number of the sphere to be heated, the galvanometer deflection is observed and heat input to that sphere is adjusted so that the galvanometer 93 returns to the zero position noted previously. This is done by setting the microammeter 95 for the appropriate circuit by means of switch 121, 123, 125, or 127 and manipulation of the corresponding heater potentiometer 79 (see Fig. 4). When the galvanometer indicates the zero position noted previously, the heat input is read in terms of milliamperes on milliammeter 95.

The above operations are performed for the next sphere to be heated until the white, black and polished spheres are at the same temperature, and the temperature balance can now be checked by setting the two heated spheres against each other and alternately against the unheated sphere: When balance is attained, the successive comparisons cause no deflection of the galvanometer 93.

EXAMPLE 4

Shielding the spheres from direct radiation from the sun by clipping on the shades 69, so that the black, white and polished spheres are completely shaded from such direct rays, and then bringing all spheres to the same temperature by introducing heat into the cooler spheres, quantitative measurement of environmental radiation exclusive of direct radiation can then be obtained by obtaining temperature balance of the spheres in the manner described in Example 3 above.

EXAMPLE 5

To measure wind velocity, switch 87 is set at position 4 and switch 91 at position 3 to balance the two polished spheres, and a known quantity of heat (40 ma.) is supplied to one polished sphere. By adjusting the galvanometer zero point with the potentiometer and reading the temperature difference in microvolts, wind velocity can be determined from the formula $$V = K\left(\frac{H}{\Delta T}\right)^2$$

where $V$ = wind velocity in meters per second, $H$ = heat input in kg. cal./m.²/hr., $K$ = a constant 0.985, and $\Delta T$ = temperature difference = $\frac{\mu v}{40}$

*Calculations*

The results of the calculations of the data taken from the environment are in terms of the radiant energy received by a totally absorbing sphere 1 m.² surface area, at 34° C. surface temperature. To convert this to heat load on a man, the reflecting power of the man's skin and clothing for the sun's radiation must be measured. The reflecting power of these surfaces may be taken to be insignificantly small in the far infrared, unless there are metal or glass surfaces to consider. The radiation load is thus considered to be the sum of the heat of the sun's rays plus the low temperature radiation from the sky and the terrestrial environment. Thus, $H = R + S_0(T_m^4 - T_s^4)$ where $H$ = radiation load
$R$ = radiation from sun
$S_0$ = Stephan-Boltzmann constant
$T_m$ = 273 + 34 = 307° A.
$T_s$ = radiant temperature of environment Accordingly, to calculate $R$, $$R = \left(\frac{I_w - 0.066 I_p}{0.752}\right)$$

when the sunlight is strong enough to make the black sphere warmer than the polished. If, under conditions of cold, etc., the polished sphere is warmer than the black, then $$R = \left(\frac{1.07 I_w - I_b}{0.81}\right)$$

where $I_b$ = heat input to black sphere = $6.28 \times 10^{-3} i_b^2 r_b$ in kg. col./m.² hr.
$i_b$ = milliamperes input to black sphere
$r_b$ = resistance of heater
$I_w$ = heat input to white sphere = $6.28 \times 10^{-3} i_w^2 r_w$
$I_p$ = heat input to polished sphere = $6.28 \times 10^{-3} i_p^2 r_p$ To calculate $T_s$, $$T_s^4 = T_b^4 + \left(\frac{I_p - 0.68 R}{4.48 \times 10^{-8}}\right)$$

when $T_b$ is greater than $T_p$ with no heat input to spheres, $$T_s^4 = T_p^4 - \left(\frac{0.68R + I_b}{4.48 \times 10^{-8}}\right)$$

when $T_b$ is less than $T_p$ with no heat input to spheres.

To calculate the radiation load on man, $$H_m = aR - S_0(T_m^4 - T_s^4)$$

where $a$ = average reflecting power of skin and clothing for sun's rays, $T_m$ = average surface temperature of skin and clothing.

It may be desirable to combine the effects of radiation and convection into an "operative" temperature to express more nearly the environmental heat stress. As derived by Gagge (see Winslow, E.-E. A.; Herrington, L. P. and Gagge, A. P.: Physiological reactions of the human body to varying environmental temperatures. Am. J. Physiol. 120:1, 1937), $$T_0 = \frac{K_r T_w + K_c T_a}{K_r + K_c}$$

where $K_r$ = radiation constant = $4A_r S_0 T_m^3$ approximately
$K_c$ = convection constant = $1.04\sqrt{V}$ approximately
$V$ = velocity
$T_a$ = air temperature
$T_w$ = "wall" temperature $T_w$ may be calculated from $H_m$ by assuming that the radiant heat load is supplied by a fictitious wall of temperature $T_w$. Thus $$S_0(T_w^4 - T_m^4) = H_m$$

or $$T_w^4 = T_m^4 + \left(\frac{H_m}{S_0}\right)$$

Other interesting information can be obtained from the panradiometer data, such as the intensity of the direct rays of the sun on a surface normal to the rays, and the intensity of the reflected and scattered radiation from the sun. To obtain the reflected and scattered radiation it is only necessary to screen the spheres from the direct sunlight and measure the intensity of the remaining radiation from the sun. Then $$R_i = \left(\frac{I'_w - 0.066 I'_p}{0.9 \times 0.752}\right) = \text{scattered and reflected sun's radiation when the black sphere is warmer than the polished in the shade with no heat input.}$$

If the converse be true then $$R_i = \left(\frac{1.07 I'_w - I'_b}{0.81}\right)$$

where $I'_w$ = heat input to white sphere in the shade
$I'_p$ = heat input to polished sphere in the shade
$I'_b$ = heat input to black sphere in the shade.

The total radiation ($R$) is the sum of the direct, scattered and reflected radiation. Thus $$R = \left(\frac{R_0}{4}\right) + R_i$$

and $R_0 = r(R - R_i)$ where $R_0$ = direct radiation which, of course, strikes only one-fourth of the area of the sphere. $R_0$ measured in this way checks within ±10% of the values obtained from a direct reading pyroheliometer.

The calculations for the panradiometer as regards radiation are based upon the heat balance equations for the three spheres, that is, heat gained by sphere by radiation from the sun plus heat put into sphere by heater = heat lost by radiation to environment plus losses due to convection and conduction. These latter factors are the same for the spheres when they are at the same temperature because they are of identical construction. Thus, for the black sphere in the sunlight, $$RE_{bv} = S_0 E_{bi}(T_b^4 - T_s^4) + C + D$$

and for the polished sphere when heated to same temperature $$RE_{pv} + I_p = S_0 E_{pi}(T_b^4 - T_s^4) + C + D$$

and for the white sphere $$RE_{wv} + I_w = S_0 E_{wv}(T_b^4 - T_s^4) + C + D$$

In these equations $R$ = sun's radiation.
$E_{bv} = 0.96$ = emissivity of black sphere for sun's radiation.
$E_{bi} = 0.95$ = emissivity of black sphere for infrared radiation.
$E_{pv} = 0.28$ = emissivity of polished sphere for sun's radiation.
$E_{wv} = 0.16$ = emissivity of white sphere for sun's radiation.
$E_{wi} = 0.89$ = emissivity of white sphere for infrared radiation.
$I_w$ = heat input to white sphere.
$I_p$ = heat input to polished sphere.
$C$ = heat lost by convection to surrounding air.
$D$ = heat lost by conduction down stem.
$S_0 = 4.93 \times 10^{-8}$ kg. cal./m.$^2$/hr. = Stephan-Boltzmann constant.

The three basic equations may be solved simultaneously and a value for $R$ and $T_s$ obtained. A similar set of equations can be set up for the conditions in the shade and a value of $R_i$ obtained. At night and in cold environments heat may have to be added to the black sphere rather than the polished but the equations are similar to those shown above and solutions for $R$, $R_i$ and $T_s$ can be obtained.

On clear days when the reflected and scattered light from the sky is small, it is possible to obtain a measurement of an important environmental constant, the albedo of the surrounding environment. We assume $R_i$ is then due to reflection from the terrestrial environment. Then $R_i = aR_0$ or $$a = \frac{R_i}{R_0} = \text{albedo}$$

In summary, it can be seen that a set of data giving a quantitative measure of thermal exchanges of total radiation in the sun and in the shade, can be obtained. With the spheres exposed to the environment to be evaluated, the temperature of the spheres is observed and the sphere of highest temperature (usually the black sphere) measured. Then supplying heat to the other two spheres (usually the white sphere and one polished sphere) to bring all three spheres to the same temperature, equilibrium is established, as indicated on the galvanometer. When equilibrium has been established, the heat input to each sphere is observed by recording the current input to the heaters. Wind velocity is then measured by heating the polished sphere with a known current and observing the temperature difference between the sphere so heated and the unheated polished sphere.

With the spheres shielded from direct solar radiation, the foregoing procedure, except for the measure of wind velocity, is then repeated.

Obviously many modifications and variations of the present invention are possible in the light of the above teachings. It is therefore to be understood that within the scope of the appended claims the invention may be practiced otherwise than as specifically described.

We claim:

1. A measuring instrument comprising a plurality of elements having discrete emissivity characteristics, means to balance the heat level of said elements, and means to measure the heat input required to achieve such balance.

2. A measuring instrument comprising a plurality of spheres of identical construction except for emissivity characteristics, means to balance the heat level of said spheres, and means to measure the heat input required to achieve such balance.

3. A measuring instrument comprising a black sphere, a white sphere and a polished sphere, said spheres being of identical construction but having discrete emissivity characteristics by reason of such differences, means to balance the heat level of said spheres, and means to measure the heat input required to achieve such balance.

4. A measuring instrument comprising a black sphere, a white sphere and a polished sphere, said spheres being of identical construction but having discrete emissivity characteristics by reason of such differences, a heating element and a thermocouple in each of said spheres, means to energize said heating elements selectively to balance the heat level of said spheres, and means coupled to said thermocouples selectively to indicate such balance.

5. A measuring instrument comprising a black sphere, a white sphere and a polished sphere, said spheres being of identical construction but having discrete emissivity characteristics by reason of such differences, a heating element wound spirally proximate the inner surface of each sphere, a thermocouple mounted in each sphere, means to energize said heating elements selectively to balance the heat level of said spheres, and means coupled to said thermocouples selectively to indicate such balance.

6. A measuring instrument comprising a black sphere, a white sphere, and a polished sphere, said spheres being of identical construction but having discrete emissivity characteristics by reason of such differences, a heating element wound spirally proximate the inner surface of each sphere, means to energize said heating elements selectively to balance the heat level of said spheres, means to indicate such energy input quantitatively, a thermocouple mounted in each sphere, and means coupled to said thermocouples selectively to indicate such balance.

7. A measuring instrument comprising a support element, a black sphere, a white sphere, and a polished sphere mounted on said element, said spheres being of identical construction but having discrete emissivity characteristics by reason of such differences, removable means to shield said spheres from direct solar radiation secured to said element, a heating element wound spirally proximate the inner surface of each sphere, means to energize said heating elements selectively to balance the heat level of said spheres, means to indicate such energy input quantitatively, a thermocouple mounted in each sphere, and means coupled to said thermocouples selectively to indicate such balance.

References Cited in the file of this patent

UNITED STATES PATENTS

| Number | Name | Date |
| --- | --- | --- |
| 2,154,927 | Yaglou | Apr. 18, 1939 |

FOREIGN PATENTS

| Number | Country | Date |
| --- | --- | --- |
| 457,543 | Germany | Mar. 19, 1928 |

OTHER REFERENCES

Penman et al.: Journal of Scientific Instruments, vol. 26, March 1949, pp. 77–80.

Richards et al.: "The Panradiometer, etc.," Review of Scientific Instruments, vol. 22, #12, pp. 925–934, December 1951.